(12) United States Patent
Aso

(10) Patent No.: US 11,383,310 B2
(45) Date of Patent: Jul. 12, 2022

(54) CUTTING INSERT

(71) Applicant: TUNGALOY CORPORATION, Fukushima (JP)

(72) Inventor: Takahiro Aso, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 97 days.

(21) Appl. No.: 17/017,032

(22) Filed: Sep. 10, 2020

(65) Prior Publication Data

US 2021/0178496 A1     Jun. 17, 2021

(30) Foreign Application Priority Data

Dec. 13, 2019   (JP) .............................. JP2019-225531

(51) Int. Cl.
   *B23C 5/20*           (2006.01)
   *B23C 5/02*           (2006.01)
   *B23C 5/06*           (2006.01)

(52) U.S. Cl.
   CPC ................ *B23C 5/202* (2013.01); *B23C 5/06* (2013.01); *B23C 5/02* (2013.01);
(Continued)

(58) Field of Classification Search
   CPC ........... B23C 5/06; B23C 5/207; B23C 5/202; B23C 2200/0427; B23C 2200/208; B23C 2200/286; B23C 2210/16; B23C 2210/168
See application file for complete search history.

(56) References Cited

U.S. PATENT DOCUMENTS 5,827,016 A * 10/1998 Strand ..................... B23C 5/202
                                                                   407/115
6,050,751 A * 4/2000 Hellstrom ........... B23B 27/1622
                                                                   407/103
(Continued)

FOREIGN PATENT DOCUMENTS

EP             3254790 A1     12/2017
JP         H09-174323 A      7/1997
(Continued)

*Primary Examiner* — Nicole N Ramos
(74) *Attorney, Agent, or Firm* — Studebaker & Brackett PC

(57) ABSTRACT

Provided is a cutting insert, which has excellent chip discharge performance even when formed with multiple corners superior in economic efficiency. A first ridgeline at which an upper surface and a circumferential side surface intersect each other includes a plurality of corners disposed at equal intervals and a plurality of main cutting edges disposed one by one between the corners adjacent to each other. A distance between the corners adjacent to each other is equal to or less than 60% of the diameter of a circle inscribed within the ridgeline. The main cutting edges includes a first cutting edge that is linearly formed and a second cutting edge that is linearly formed. The length of the second cutting edge is equal to or less than half the length of the first cutting edge and is positioned closer to a center side of the cutting insert than an extension line of the first cutting edge is. The circumferential side surface includes a first side surface facing the first cutting edge and a second side surface facing the second cutting edge. A clearance angle of the first side surface is smaller than that of the second side surface.

6 Claims, 10 Drawing Sheets

(52) U.S. Cl.
CPC .. *B23C 2200/0422* (2013.01); *B23C 2200/12* (2013.01); *B23C 2200/125* (2013.01)

(56) References Cited

U.S. PATENT DOCUMENTS

| | | | |
|---|---|---|---|
| 6,254,316 B1 * | 7/2001 | Strand | B23C 5/2243 |
| | | | 407/116 |
| 6,543,970 B1 * | 4/2003 | Qvarth | B23C 5/202 |
| | | | 407/115 |
| 7,802,944 B2 * | 9/2010 | Engstrom | B23C 5/2247 |
| | | | 407/66 |
| 8,430,607 B2 * | 4/2013 | Jansson | B23C 5/06 |
| | | | 407/103 |
| 2002/0028116 A1 | 3/2002 | Morgulis | |
| 2003/0039519 A1 | 2/2003 | Scherbarth | |
| 2008/0304924 A1 | 12/2008 | Engstrom et al. | |
| 2012/0308318 A1 * | 12/2012 | Burtscher | B23C 5/202 |
| | | | 407/113 |
| 2014/0193216 A1 * | 7/2014 | Maeta | B23C 5/202 |
| | | | 407/113 |
| 2016/0288224 A1 * | 10/2016 | Ishi | B23C 5/06 |
| 2017/0120351 A1 * | 5/2017 | Fang | B23C 5/06 |
| 2017/0225243 A1 * | 8/2017 | Matsumura | B23C 5/202 |
| 2017/0320145 A1 * | 11/2017 | Pettersson | B23C 5/2213 |

FOREIGN PATENT DOCUMENTS

| | | | | |
|---|---|---|---|---|
| JP | 2001025907 A | * | 1/2001 | |
| JP | 2007-190675 A | | 8/2007 | |
| JP | 2008-302493 A | | 12/2008 | |
| JP | 2017071056 A | * | 4/2017 | B23C 5/06 |
| WO | WO-0066305 A1 | * | 11/2000 | B23C 5/202 |
| WO | 2009/096516 A1 | | 8/2009 | |

* cited by examiner

CUTTING INSERT

CROSS-REFERENCES TO RELATED APPLICATIONS

This application relates to and claims priority from Japanese Patent Application No. 2019-225531, filed on Dec. 13, 2019, the entire disclosure of which is incorporated herein by reference.

BACKGROUND

Field

The present invention relates to a cutting insert used for a rotating tool such as a face milling tool.

Description of Related Art

A rotating tool such as a face milling tool includes a disk-shaped tool body that is attached to a main axis of a machine tool and driven to rotate and a plurality of cutting inserts that are mounted respectively in pockets provided on an outer circumferential portion of the tool body and that cut a work material. A cutting insert having a square or regular triangular shape is formed to be rotationally symmetric around a screw hole thereof and has a plurality of cutting edges replaceable for use. A cutting insert having a large number of cutting edges, i.e., a cutting insert having a regular octagonal or regular hexagonal shape, exhibits higher economic efficiency than a cutting insert having a square or regular triangular shape.

However, in a case where a diameter of an inscribed circle is same, the greater the number of corners is, the shorter a length of each cutting edge becomes, thus shapes of cutting edges of a cutting insert having a large number of cutting edges tend to be monotone. For example, a cutting insert having a regular octagonal shape disclosed in WO 2009/096516 includes bilaterally symmetric monotone straight lines.

SUMMARY

Whether chips that are generated when cutting a work material can be smoothly discharged from a rotating tool to outside depends on a shape of a cutting edge. Most of the chips flowing out from a rake face toward a rotation center of a tool body are reflected by a wall surface of a pocket and are discharged to the outside of the pocket. However, in some rare cases, depending on the shape of a work material, some chips may move toward a flank of a cutting insert instead of moving to the rotation center of the tool body. If a space between the flank of the cutting insert and a finished surface of the work material is small, chips may be caught in the space.

Therefore, it is an object of the present invention to provide a cutting insert that exhibits excellent chip discharge performance even when the cutting insert is formed with multiple corners superior in economic efficiency.

A cutting insert according to one aspect of the present invention has an upper surface, a lower surface on an opposite side to the upper surface and a circumferential side surface connecting the upper surface and the lower surface to each other. A ridgeline at which the upper surface and the circumferential side surface intersect each other includes a plurality of corners disposed at equal intervals, and a plurality of cutting edges disposed one by one between the corners adjacent to each other. A distance between the corners adjacent to each other is equal to or less than 60% of a diameter of a circle inscribed within the ridgeline. The cutting edges include a first cutting edge that is linearly formed and a second cutting edge that is linearly formed. The second cutting edge has a length equal to or less than half a length of the first cutting edge and is positioned closer to a center side of the cutting insert than an extension line of the first cutting edge is. The circumferential side surface includes a first side surface facing the first cutting edge and a second side surface facing the second cutting edge. A clearance angle of the first side surface is smaller than that of the second side surface.

According to this aspect, chips directed toward a flank side can be discharged from a space between the flank of the second cutting edge and a finished surface. The second cutting edge is configured to retreat toward the central part further than the first cutting edge in a rake face and have a clearance angle larger than that of the first cutting edge in the flank. Since a larger space can be secured between the flank of the second cutting edge and the finished surface, chip discharge performance can be improved even in the case of a multi-corner cutting insert superior in economic efficiency.

In the above aspect, the second side surface may extend to an opposite side thereof to the cutting edge, with the first side surface interposed therebetween. The circumferential side surface may further include a third side surface facing, from a side opposite to the cutting edge, the second side surface. The third side surface may be formed as a curved surface recessed toward the center side of the cutting insert.

According to this aspect, since the third side surface is recessed more than the second side surface, a larger space can be secured between the circumferential side surface, which is the flank, and the finished surface.

In the above aspect, the circumferential side surface may further include a fourth side surface connecting the third side surface and the lower surface to each other. A clearance angle of the fourth side surface may be smaller than those of the first side surface and the second side surface.

According to this aspect, since the clearance angle of the fourth side surface is smaller, a contour of the lower surface becomes clearer. A mistake in mounting the cutting insert can be prevented in advance. The cutting insert is mounted on a tip seat provided in a pocket of a rotating tool. The lower surface and the circumferential side surface of the cutting insert abut a seat surface and a restraining surface of the tip seat, respectively. If the contour of the lower surface of the cutting insert is not clear, an operator may erroneously attach the cutting insert and the lower surface may be on the restraining surface of the tip seat.

In the above aspect, all the corners may be at the same height from the lower surface.

As the number of corners increases, it becomes more difficult to change a height from the lower surface to the cutting edge. According to this aspect, the corners adjacent to each other have the same height and it is unnecessary to change the height of the cutting edge, and thus it has excellent productivity even with the multiple corners.

In the above aspect, the first side surface may be formed to be narrower with increasing separation from the corner adjacent thereto.

According to this aspect, since the first side surface having a smaller clearance angle has a wider width in a region near the corner, the first cutting edge becomes thick and is unlikely to be chipped. Since the first side surface positioned between the first cutting edge and the second side surface has a narrower width in a region away from the corner, the second side surface comes closer to the first cutting edge and chips are easily discharged. The cutting edge can have both durability and good chip discharge performance.

According to the present invention, it is possible to provide a cutting insert which has excellent chip discharge performance even when it is formed to have multiple corners superior in economic efficiency.

DETAILED DESCRIPTION

Figure 1:
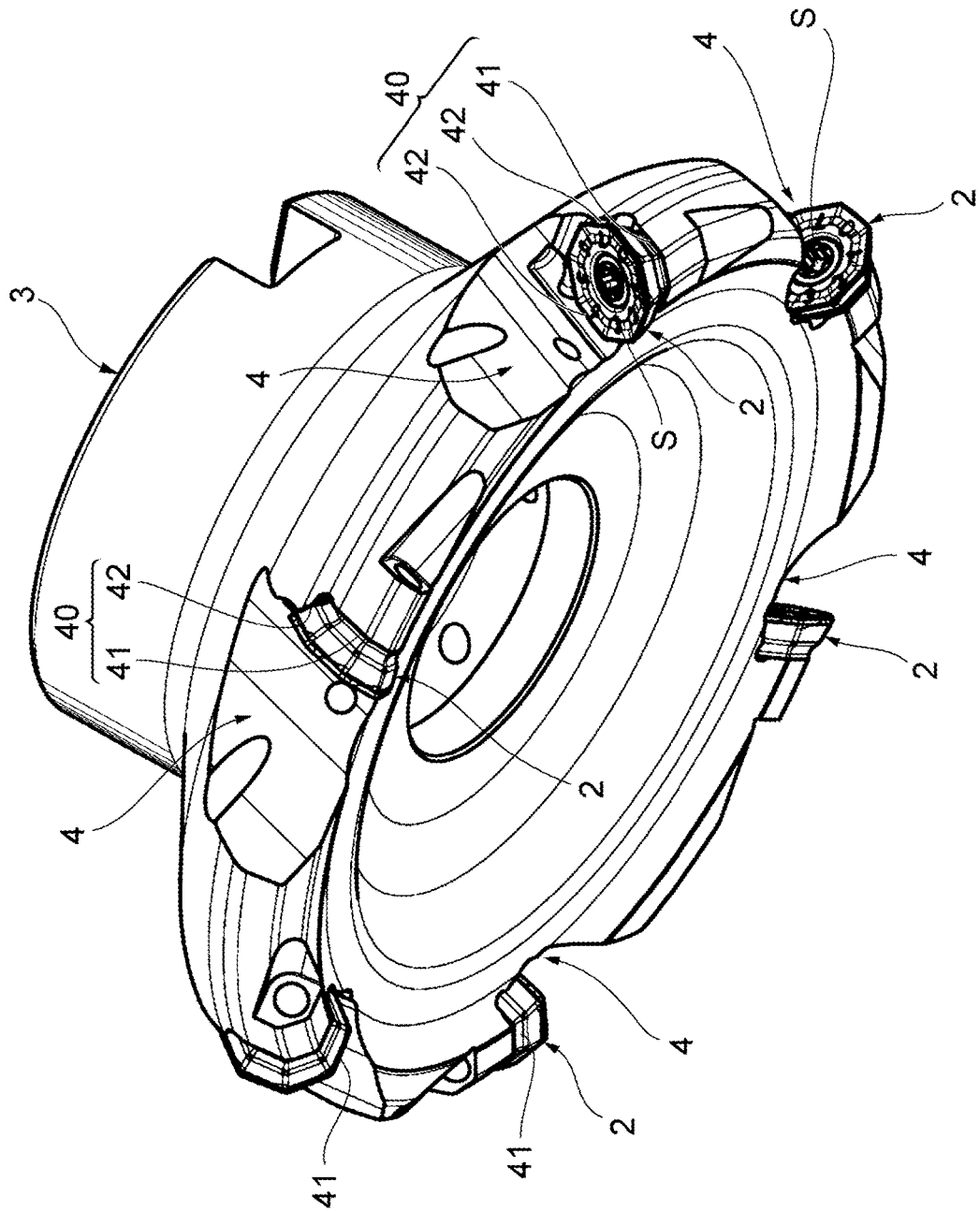
FIG. 1 is a perspective view showing an example of a rotating tool on which a cutting insert according to each embodiment of the present invention is mounted.

Preferred embodiments of the present invention will be described with reference to the accompanying drawings. In addition, in each of the drawings, components denoted by the same reference numerals have the same or similar configurations. In a cutting insert 2 of each embodiment of the present invention, a main cutting edge 50 includes a first cutting edge 51 and a second cutting edge 52. One feature thereof is that the second cutting edge 52 is positioned closer to a central part of the cutting insert 2 than the first cutting edge 51 is, and a clearance angle of a flank thereof is larger than that of the first cutting edge 51. Since a larger space between the flank of the second cutting edge 52 and a finished surface can be secured, excellent chip discharge performance is obtained even with multiple corners. These configurations will be described in detail below with reference to FIGS. 1 to 10.

FIG. 1 is a perspective view showing an example of a rotating tool 1 on which a cutting insert according to each embodiment of the present invention is mounted. The rotating tool 1 is, for example, a face milling tool, and includes a tool body (a cutter body) 3 formed in a disk shape, and a plurality of cutting inserts 2 mounted on an outer circumferential portion of the tool body 3. The rotating tool 1 is not limited to a face milling tool and may be another type of rotating tool.

As shown in FIG. 1, pockets (recesses) 4 are provided on the outer circumferential portion of the tool body 3 at equal intervals. Each of the pockets 4 is provided with a tip seat 40 for mounting the cutting insert 2. The tip seat 40 has a seat surface 41 and a restraining surface 42 standing upright from the seat surface 41. The seat surface 41 abuts a lower surface 6 of the cutting insert 2, which will be described later, and the restraining surface 42 abuts a circumferential side surface 7 of the cutting insert 2, which will be described later. The cutting insert 2 is fixed to the tip seat 40 with a fastening screw S or the like.

First Embodiment

Figure 2:
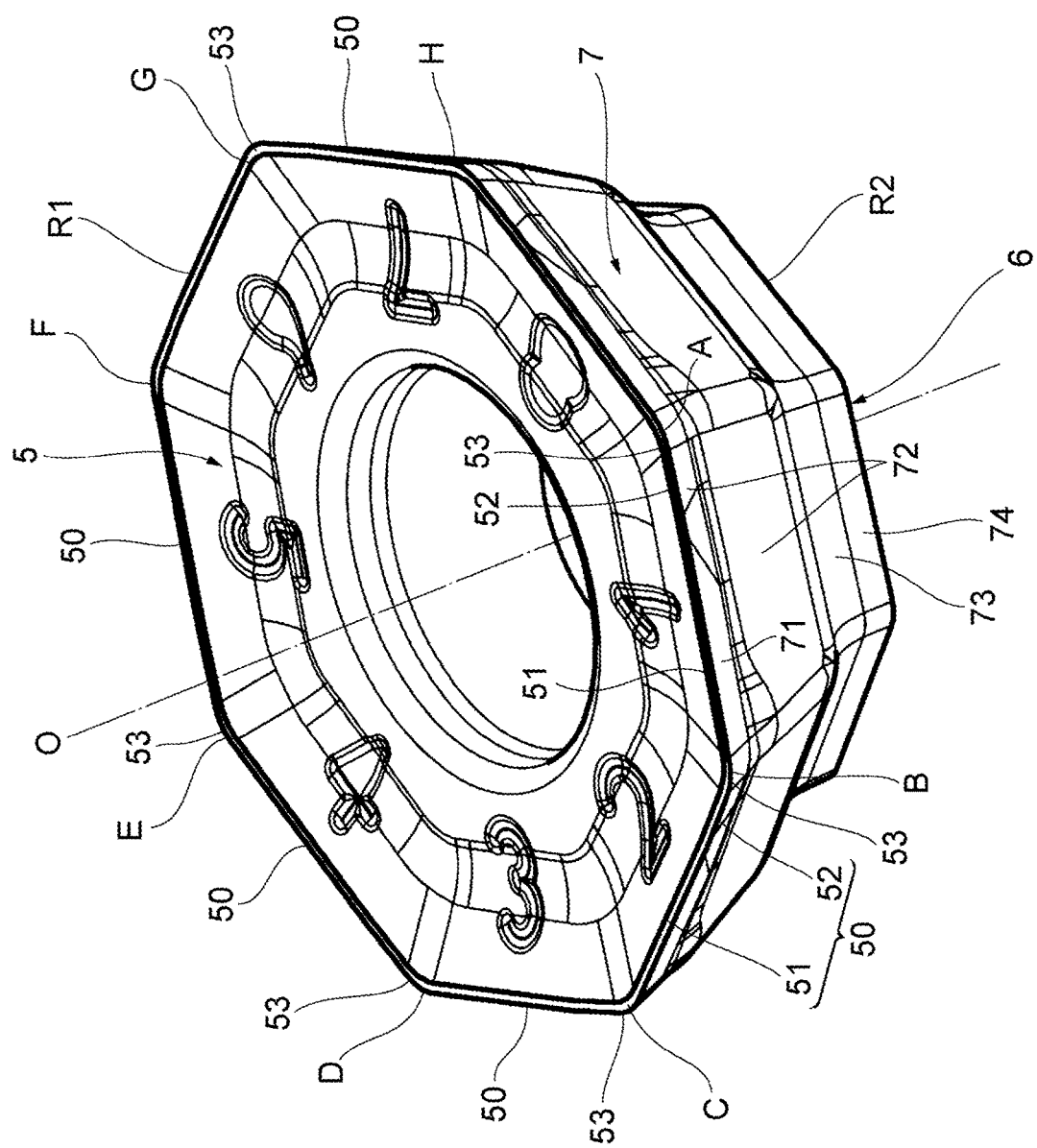
FIG. 2 is a perspective view showing an example of the cutting insert according to a first embodiment of the present invention.

FIG. 2 is a perspective view showing an example of the cutting insert 2 according to a first embodiment of the present invention. As shown in FIG. 2, the cutting insert 2 has an upper surface 5, a lower surface 6 on a side opposite to the upper surface 5, and a circumferential side surface 7 connecting the upper surface 5 to the lower surface 6, and a screw hole that penetrates the upper surface 5 and the lower surface 6 is formed therein.

The upper surface 5 and the lower surface 6 are rotationally symmetrical about a center of the screw hole (in the illustrated example, the angle of symmetry is 45 degrees). In the following description, a straight line passing through the center of the screw hole is referred to as a central axis O of the cutting insert 2, a side closer to the central axis O is referred to as a central part of the cutting insert 2, and a side away from the central axis O is referred to as an outer circumferential side of the cutting insert 2.

Figure 3:
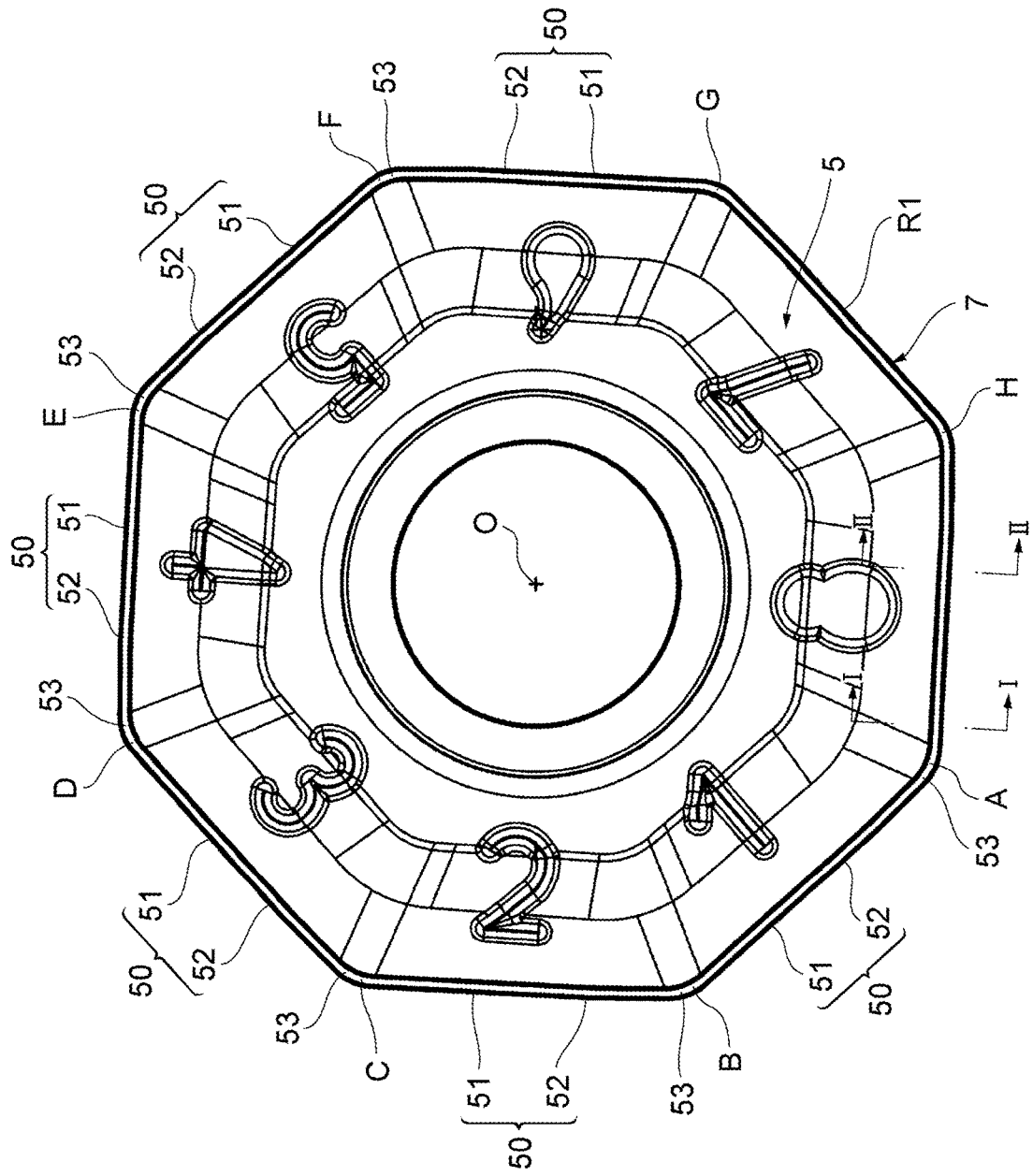
FIG. 3 is a plan view showing an upper surface of the cutting insert shown in FIG. 2.

FIG. 3 is a plan view showing the upper surface 5 of the cutting insert 2 shown in FIG. 2. In the illustrated example, a first ridgeline R1 at which the upper surface 5 and the circumferential side surface 7 intersect each other is formed in a substantially regular octagonal shape including a plurality of corners A, B, C, D, E, F, G, and H disposed at equal intervals. Also, a shape of the first ridgeline R1 is not limited to the illustrated example and may be hexagonal or decagonal. The shape of the first ridgeline R1 will be described in detail later.

Figure 4:
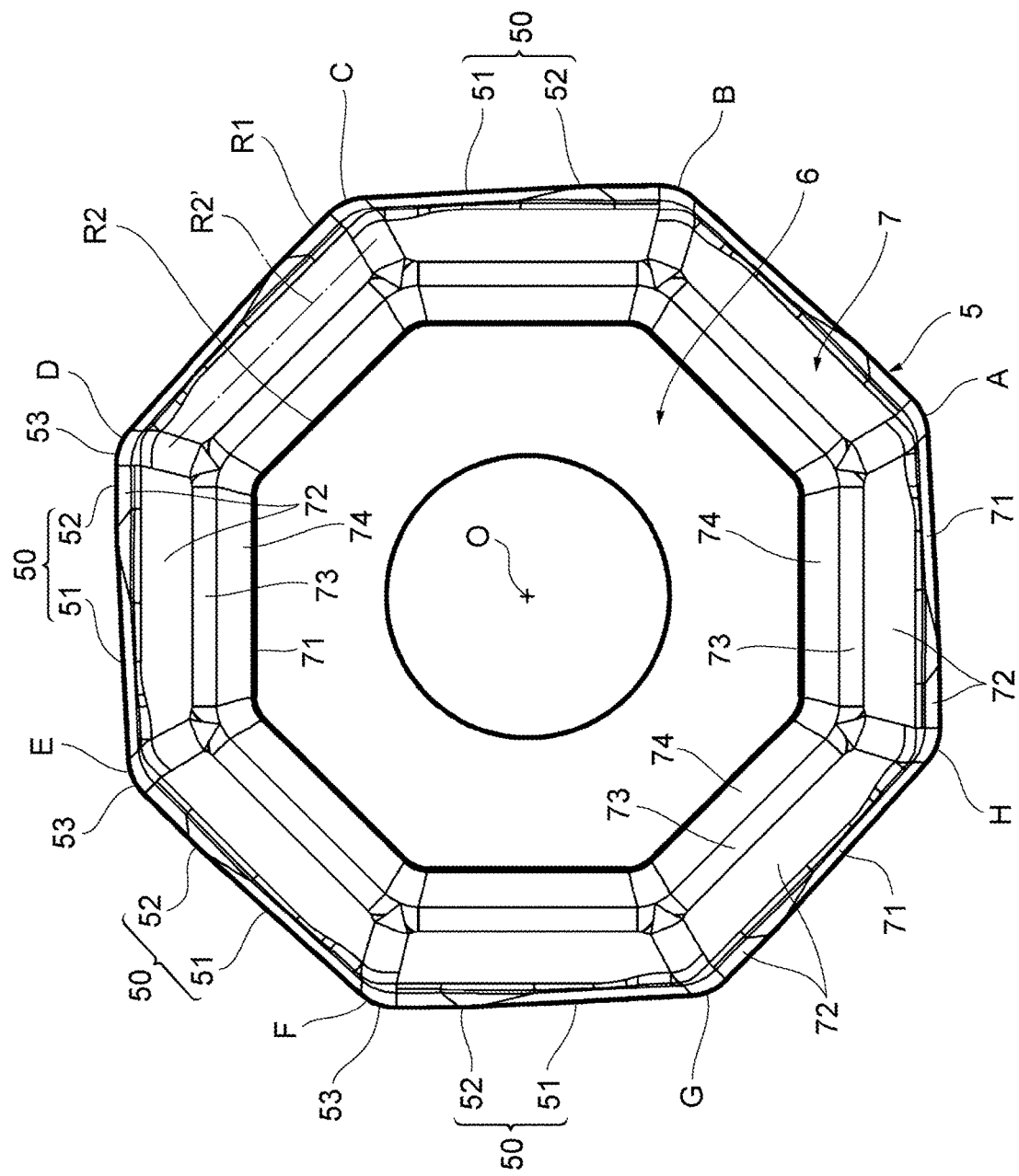
FIG. 4 is a bottom view showing a lower surface of the cutting insert shown in FIG. 2.

As shown in FIG. 3, main cutting edges 50 that are examples of a cutting edge are disposed one by one between the corners adjacent to each other, that is, on each side AB, BC, CD, DE, EF, FG, GH, and HA. In the illustrated example, a corner edge 53 is formed at each of the corners A, B, C, D, E, F, G, and H. The corner edge 53 is formed in an arc shape and smoothly connects adjacent main cutting edges 50 to each other. FIG. 4 is a bottom view showing the lower surface 6 of the cutting insert 2 shown in FIG. 2. As shown in FIG. 4, a second ridgeline R2 at which the lower surface 6 and the circumferential side surface 7 intersect each other is formed in a substantially regular octagonal shape, like the first ridgeline R1. In the following description, an imaginary line parallel to one side of the second ridgeline R2 is referred to as R2'.

Figure 5:
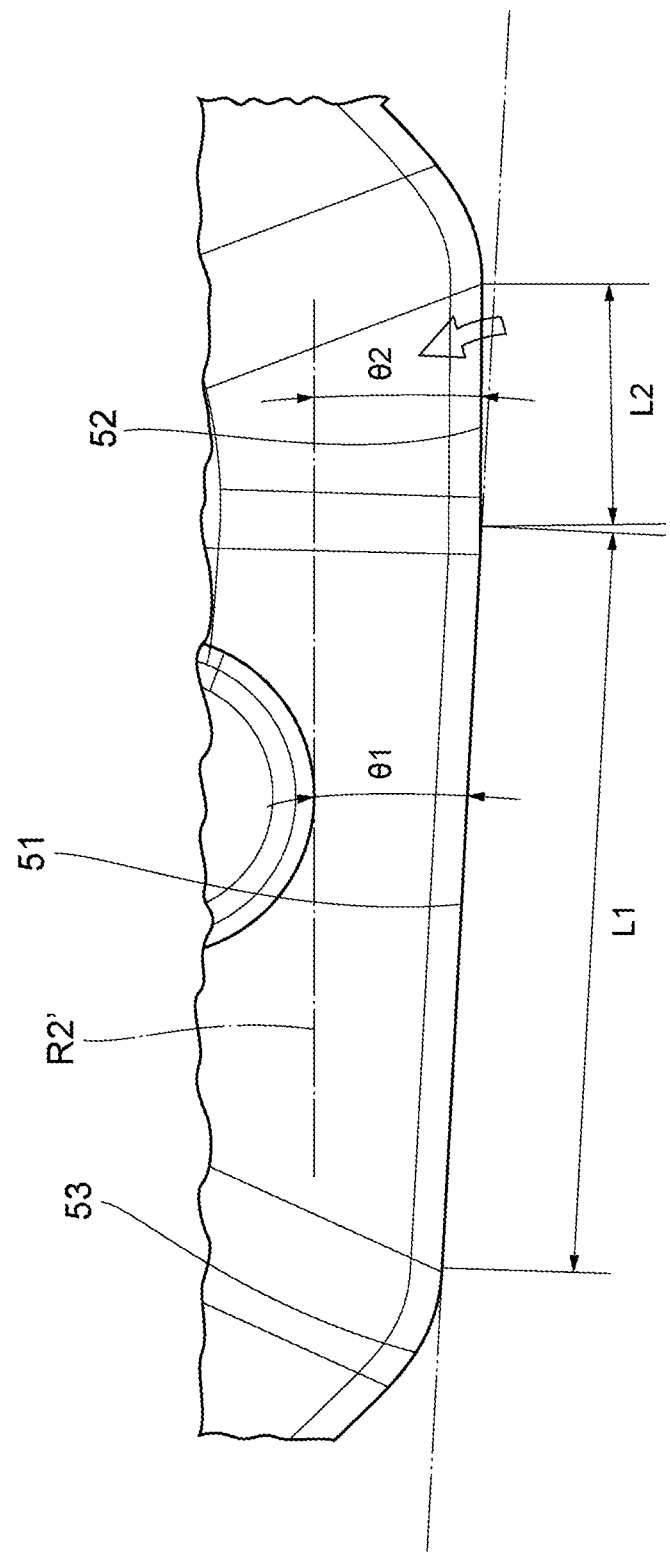
FIG. 5 is an enlarged plan view showing a first cutting edge and a second cutting edge shown in FIG. 3.

FIG. 5 is an enlarged plan view showing the first cutting edge and the second cutting edge shown in FIG. 3. As shown in FIG. 5, the main cutting edge 50 includes the first cutting edge 51 that is linearly formed and the second cutting edge 52 that is also linearly formed. A gap between the first cutting edge 51 and the second cutting edge 52 may be connected by an arc-shaped cutting edge.

The second cutting edge 52 is slightly inclined with respect to the first cutting edge 51 and is positioned closer to the central part of the cutting insert 2 than an extension line of the first cutting edge 51 is. More specifically, an angle 81 formed by the imaginary line R2' parallel to the second ridgeline R2 and the first cutting edge 51 is larger than an angle 82 formed by the imaginary line R2' and the second cutting edge 52. In the illustrated example, θ1 is 3 degrees and θ2 is 0.4 degrees.

The first cutting edge 51 is longer than the second cutting edge 52. More specifically, an inflection point at which a curve of the corner edge 53 is switched to a straight line is defined as a starting point of the first cutting edge 51 and an ending point of the second cutting edge 52, and a midpoint of a minute curve connecting the first cutting edge to the second cutting edge is defined as an ending point of the first cutting edge 51 and a starting point of the second cutting edge 52. In this case, a length L2 of the second cutting edge 52 is equal to or less than half a length L1 of the first cutting edge 51.

Figure 6:
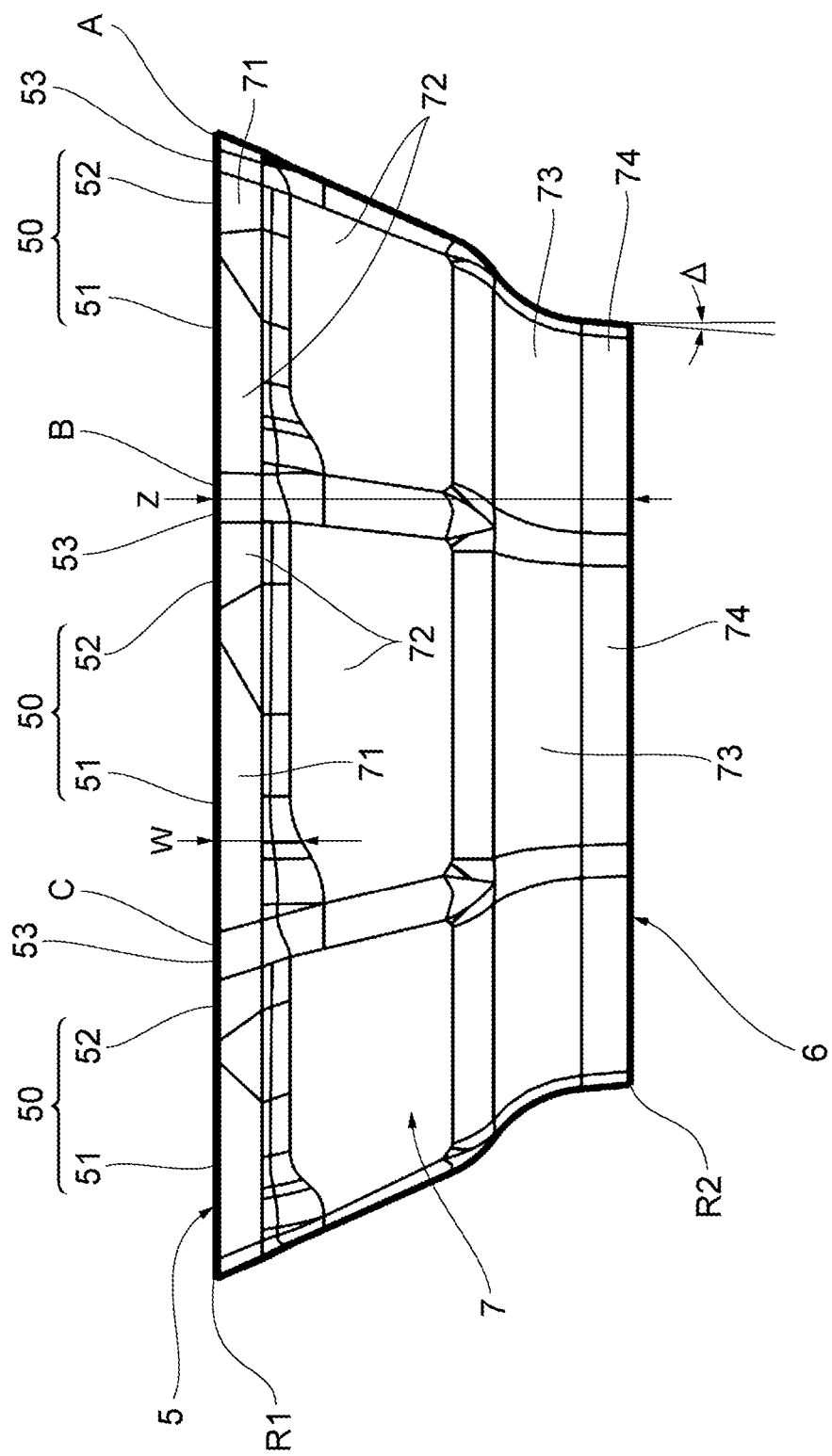
FIG. 6 is a side view showing a circumferential side surface of the cutting insert shown in FIG. 2.

FIG. 6 is a side view showing the circumferential side surface 7 of the cutting insert 2 shown in FIG. 2. As shown in FIG. 6, all the corners A, B, C, . . . have the same height Z from the lower surface 6. In the illustrated example, the circumferential side surface 7 includes a first side surface 71, a second side surface 72, a third side surface 73, and a fourth side surface 74.

The first side surface 71 is formed to face the first cutting edge 51. The second side surface 72 is formed to face the second cutting edge 52. The second side surface 72 extends to a side opposite to the main cutting edge 50 (first cutting edge 51) with the first side surface 71 interposed therebetween. In other words, the second side surface 72 also extends to a region below the first side surface 71 (a side from the upper surface 5 toward the lower surface 6).

The third side surface 73 has a strip shape parallel to the upper surface 5 and the lower surface 6 and is formed as a curved surface that is recessed toward the central part of the cutting insert 2. The third side surface 73 is formed to face the second side surface 72 from below (a side opposite to the main cutting edge 50). The fourth side surface 74 connects the third side surface 73 to the lower surface 6.

That is, the second side surface 72, the third side surface 73, and the fourth side surface 74 are arranged in order from the upper surface 5 to the lower surface 6. A part of the second side surface 72 is replaced with the first side surface 71 formed along the first cutting edge 51. A width W of the first side surface 71 is formed to become narrower toward a side away from the corner adjacent thereto (for example, the corner C).

The fourth side surface 74 is formed in a strip shape parallel to the upper surface 5 and the lower surface 6. An angle Δ at which the fourth side surface 74 is inclined with respect to the central axis O of the cutting insert 2 is formed smaller than a clearance angle α (shown in FIG. 7) of the first side surface 71 and a clearance angle β (shown in FIG. 7) of the second side surface 72. If the inclination angle Δ of the fourth side surface 74 is smaller, the second ridgeline R2 that is a contour of the lower surface 6 becomes clearer, and thus the cutting insert 2 can be easily attached.

Figure 7:
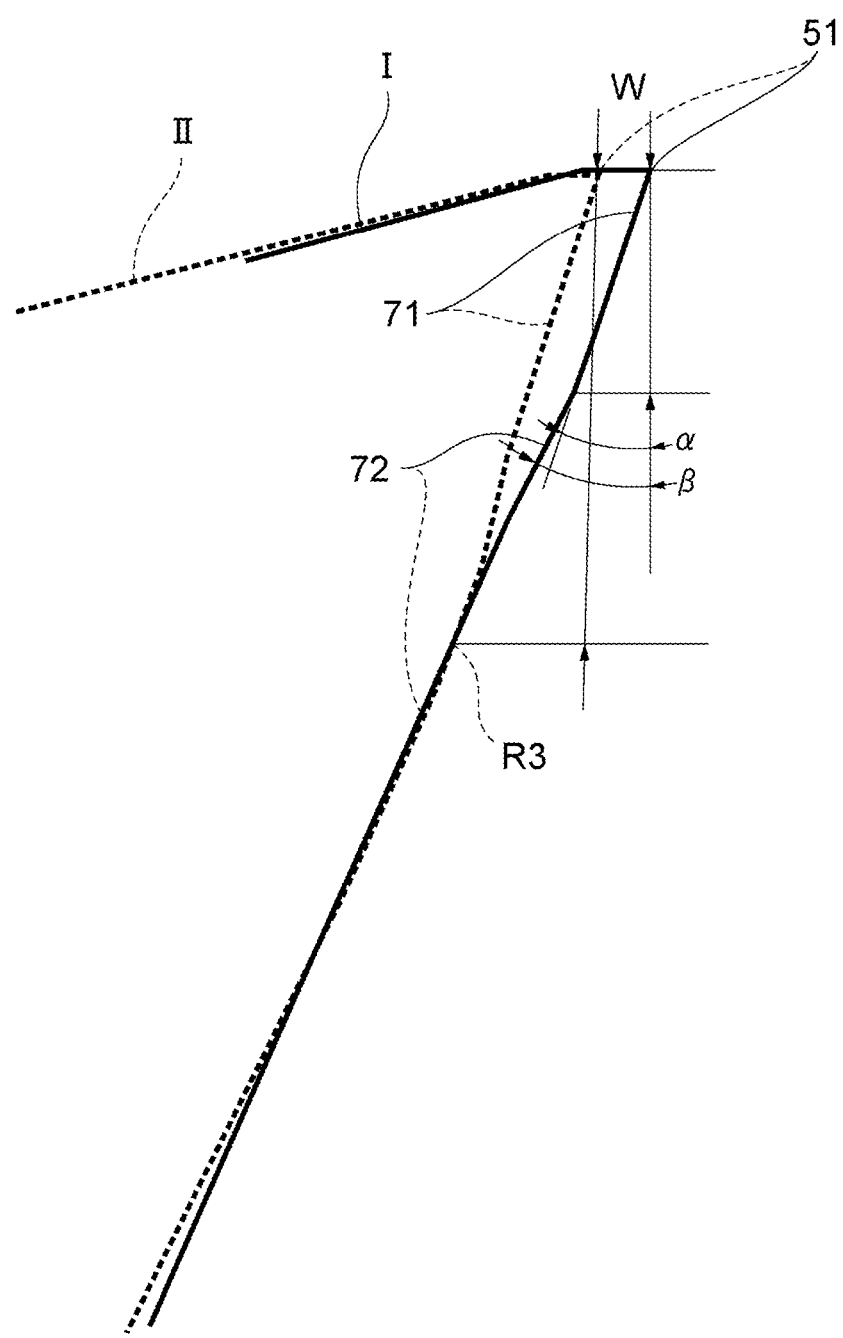
FIG. 7 is a diagram showing contours along line I-I and line II-II in FIG. 3 in an overlapping manner.

FIG. 7 is a diagram showing contours along line I-I and line II-II in FIG. 3 in an overlapping manner. As shown in FIG. 7, the clearance angle α of the first side surface 71 is formed smaller than the clearance angle β of the second side surface 72. Since the first side surface 71 having the smaller clearance angle α has a wider width in a region near the corner adjacent thereto, the first cutting edge 51 becomes thicker and is unlikely to be chipped. Since the first side surface 71 positioned between the first cutting edge 51 and the second side surface 72 has a narrower width in a region away from the corner adjacent thereto, the second side surface 72 comes closer to the first cutting edge 51 and thus chips are easily discharged.

Since the clearance angle α of the first side surface 71 is smaller than the clearance angle β of the second side surface 72, a third ridgeline R3 at which the first side surface 71 and the second side surface 72 intersect each other is formed to be convex outward from the cutting insert 2. Chips generated from the first cutting edge 51 cannot move to a space between the second side surface 72 and a finished surface unless they cross the third ridgeline R3. An outwardly protruding amount of the third ridgeline R3 is proportional to the width W of the first side surface 71. As described above, the width W of the first side surface 71 becomes narrower toward a side away from the corner adjacent thereto. In the vicinity of the second cutting edge 52, the protruding amount of the third ridgeline R3 is smaller, and thus chips are easily discharged.

In the cutting insert 2 according to the first embodiment of the present invention configured as described above and the rotating tool 1 including the cutting insert 2, the second cutting edge 52 is retreated closer to the central part than the first cutting edge 51 is when viewed from the upper surface 5 which is the rake face. When viewed from the circumferential side surface 7 which is the flank, the second side surface 72 of the second cutting edge 52 is configured to have a larger clearance angle than the first side surface 71 which is the flank of the first cutting edge 51.

Since a larger space can be secured between the second side surface 72 and the finished surface, chip discharge performance can be improved even in the case of a multi-corner cutting insert 2 superior in economic efficiency. A larger space between the flank and the finished surface can be secured on the third side surface 73, which is recessed more than the second side surface 72.

However, as the number of the corners A, B, C, . . . increases, lengths of the main cutting edges 50 formed between the adjacent corners AB, BC, . . . decrease. For example, in a cutting insert having a square shape ABCD, distances between adjacent corners, that is, lengths of each side AB, BC, CD, and DA, are 100% of the diameter of a circle inscribed therein. In a cutting insert having a regular pentagonal shape ABCDE, distances AB, BC, . . . between adjacent corners are 72.7% of the diameter of a circle inscribed therein. In a cutting insert having a regular hexagonal shape ABCDEF, distances AB, BC, . . . between adjacent corners are 57.7% of the diameter of a circle inscribed therein.

In a cutting insert having a regular heptagonal shape ABCDEFG, distances AB, BC, . . . between adjacent corners are 48.2% of the diameter of a circle inscribed therein. In a cutting insert having a regular octagonal shape ABCDEFGH, distances AB, BC, . . . between adjacent corners are 41.4% of the diameter of a circle inscribed therein. In a cutting insert having a regular nonagonal shape ABCDEFGHI, distances AB, BC, . . . between adjacent corners are 36.4% of the diameter of a circle inscribed therein. In a cutting insert having a regular decagonal shape ABCDEFGHIJ, distances AB, BC, . . . between adjacent corners are 32.5% of the diameter of a circle inscribed therein.

According to the first embodiment, since it is possible to configure the cutting insert 2 that has excellent chip discharge performance even when the distances AB, BC, . . . between the corners adjacent to each other are smaller, the distances AB, BC, . . . between the corners may be equal to or less than 60% of the diameter of a circle inscribed therein. In other words, the cutting insert 2 of the present invention may be a regular polygon having six or more sides. The present invention is suitable for a regular hexagonal to regular decagonal cutting insert 2 superior in economic efficiency.

Second Embodiment

Figure 8:
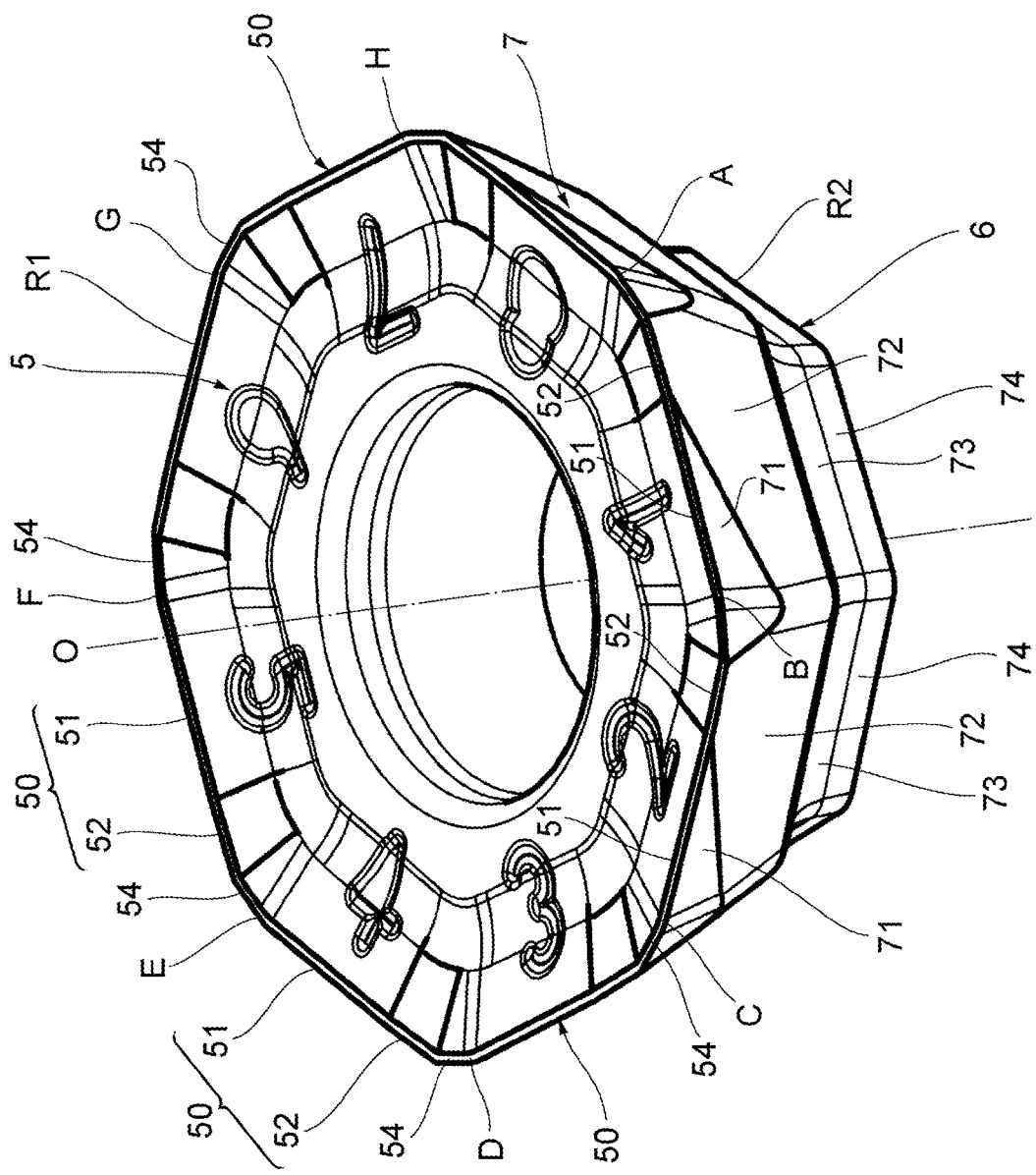
FIG. 8 is a perspective view showing an example of a cutting insert according to a second embodiment of the present invention.
Figure 9:
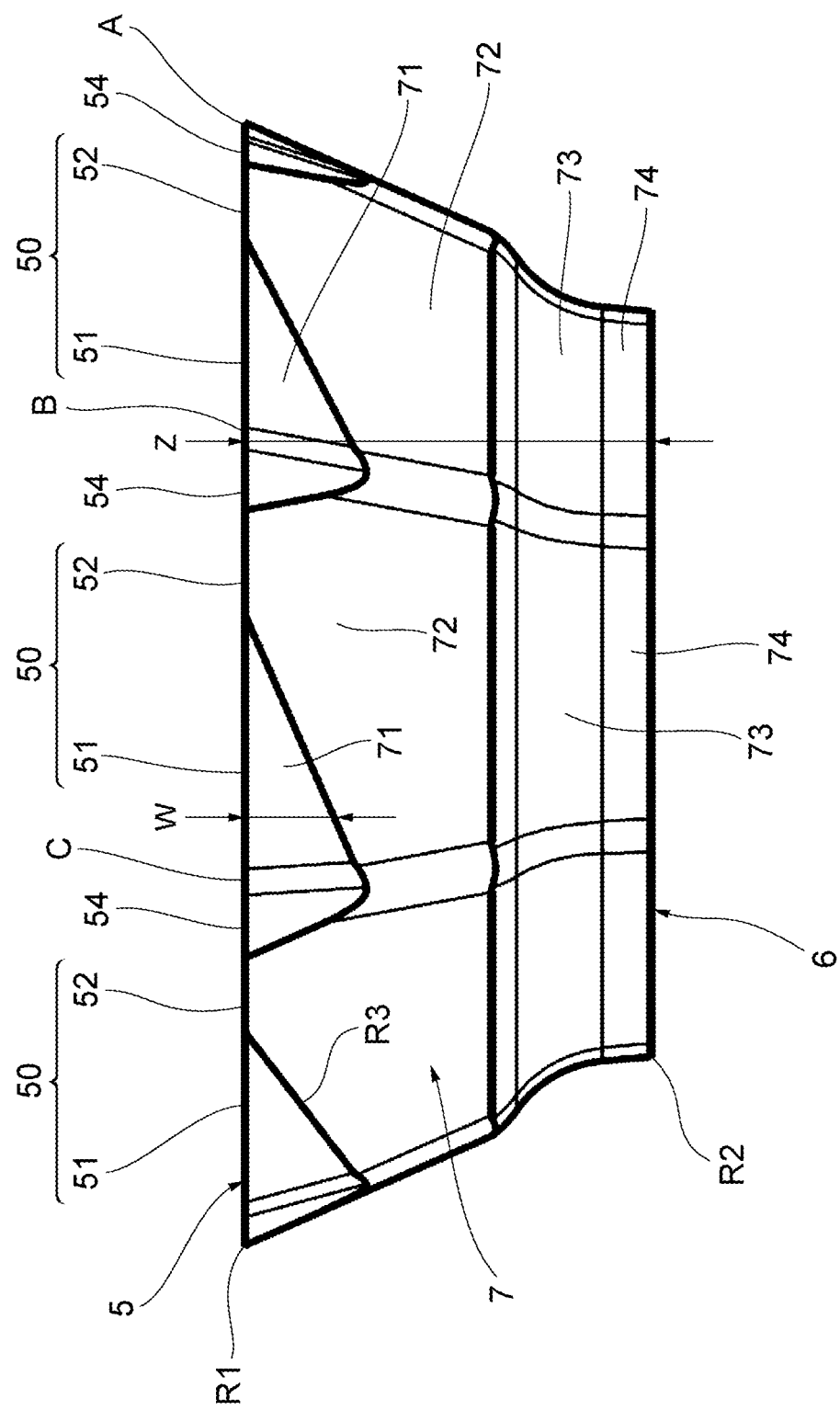
FIG. 9 is a side view showing a circumferential side surface of the cutting insert shown in FIG. 8.

Next, a rotating tool 1 according to a second embodiment of the present invention will be described with reference to FIGS. 8 to 10. Also, in the second embodiment, descriptions regarding matters common to the first embodiment will be omitted, and only different points will be described. FIG. 8 is a perspective view showing an example of a cutting insert 2 according to a second embodiment of the present invention, and FIG. 9 is a side view showing a circumferential side surface 7 of the cutting insert 2 shown in FIG. 8. The second embodiment is different from the first embodiment in that the circumferential side surface 7 is ground.

In the second embodiment, as shown in FIG. 9, the third ridgeline R3 at which the first side surface 71 and the second side surface 72 intersect each other is linear. As shown in FIG. 8, linear chamfers 54 are formed at the corners A, B, C, D, E, F, G, and H. The linear chamfers 54 connect gaps between the main cutting edges 50 adjacent to each other.

Figure 10:
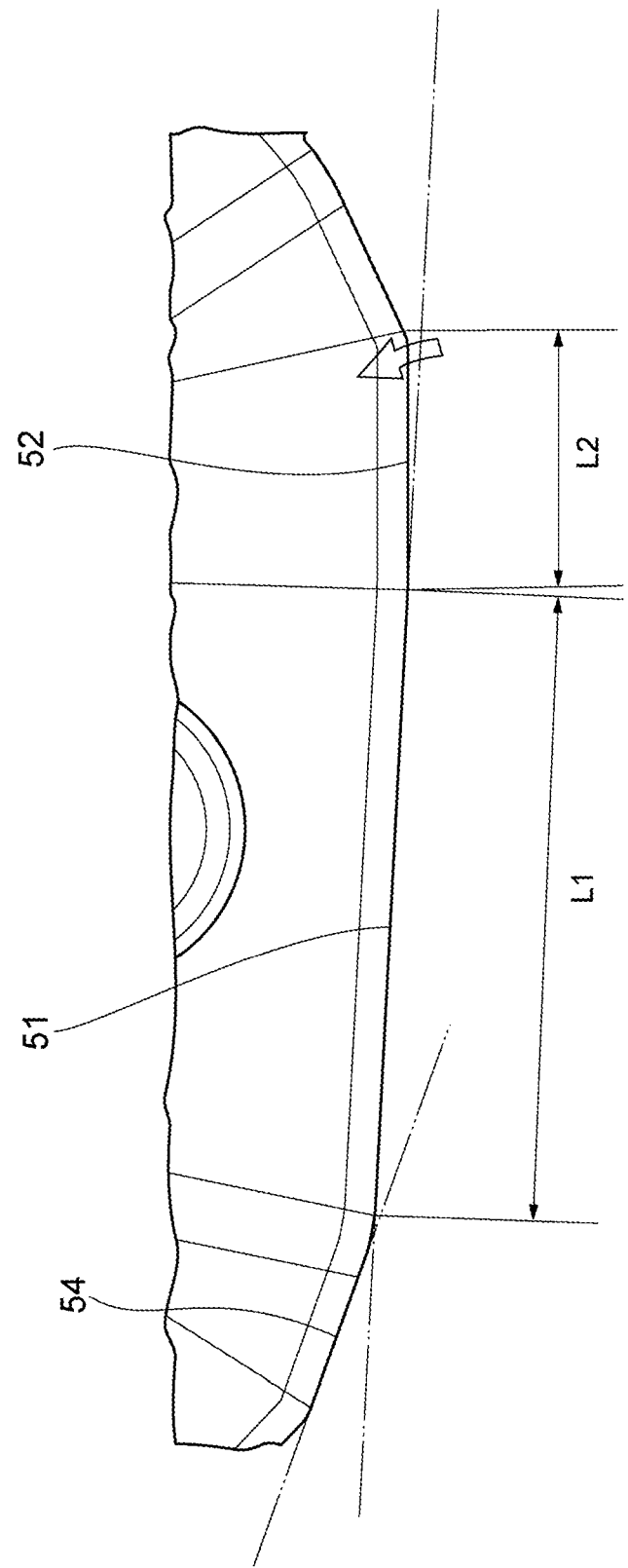
FIG. 10 is an enlarged plan view showing a first cutting edge and a second cutting edge shown in FIG. 8.

FIG. 10 is an enlarged plan view showing a first cutting edge 51 and a second cutting edge 52 shown in FIG. 8. Similar to the first embodiment, the second cutting edge 52 is retreated closer to the central part than an extension line of the first cutting edge 51 is. A length L2 of the second cutting edge 52 is equal to or less than half a length L1 of the first cutting edge 51. Also, in the illustrated example, there is no gap between the first cutting edge 51 and the second cutting edge 52.

According to the second embodiment, similarly to the first embodiment, it is possible to provide the cutting insert 2 that has excellent chip discharge performance even when it is formed to have multiple corners. Since the circumferential side surface 7 is ground in the second embodiment, dimensional accuracy is superior to that in the first embodiment.

The embodiments described above are for facilitating understanding of the present invention and are not for limiting construction of the present invention. The elements included in the embodiments and their arrangement, materials, conditions, shapes, sizes and the like are not limited to those exemplified but can be modified as appropriate. Further, the configurations shown in different embodiments can be partially replaced or combined.

What is claimed is:

1. A cutting insert comprising: an upper surface; a lower surface on an opposite side to the upper surface; and a circumferential side surface connecting the upper surface and the lower surface to each other, wherein
    a ridgeline at which the upper surface and the circumferential side surface intersect each other includes a plurality of corners disposed at equal intervals and a plurality of cutting edges disposed one by one between the corners adjacent to each other,
    the cutting insert is a regular polygon having six or more sides,
    the cutting edges include a first cutting edge that is linearly formed and a second cutting edge that is linearly formed,
    the second cutting edge has a length equal to or less than half a length of the first cutting edge and is positioned closer to a central axis of the cutting insert than an imaginary extension line extending from the first cutting edge in a direction towards the second cutting edge,
    the circumferential side surface includes a first side surface facing the first cutting edge and a second side surface facing the second cutting edge, and
    a clearance angle of the first side surface is smaller than that of the second side surface, wherein
    the second side surface extends in a direction towards the lower surface to a side opposite the first cutting edge, the first side surface being interposed between the first cutting edge and the side opposite the first cutting edge, the second side surface extending to a region below the first side surface between the first side surface and the side opposite the first cutting edge,
    the circumferential side surface further includes a third side surface extending towards the lower surface from the second side surface, the third side surface starting at the side opposite the first cutting edge, and
    the first side surface is formed to be narrower with increasing separation from the corner adjacent thereto.

2. The cutting insert according to claim 1, wherein the third side surface is formed as a curved surface recessed toward the center side of the cutting insert.

3. The cutting insert according to claim 1, wherein the circumferential side surface further includes a fourth side surface connecting the third side surface and the lower surface to each other, and
    a clearance angle of the fourth side surface is smaller than those of the first side surface and the second side surface.

4. The cutting insert according to claim 1, wherein all the corners are disposed at an equal height from the lower surface.

5. The cutting insert according to claim 2, wherein all the corners are disposed at an equal height from the lower surface.

6. The cutting insert according to claim 3, wherein all the corners are disposed at an equal height from the lower surface.

* * * * *